(12) United States Patent
Bolte

(10) Patent No.: US 12,379,068 B2
(45) Date of Patent: Aug. 5, 2025

(54) ACTIVATION SYSTEM FOR AN EMERGENCY STOP SYSTEM

(71) Applicant: United Conveyor & Machinery, LLC, Hebron, KY (US)

(72) Inventor: Arlyn Bolte, Edgewood, KY (US)

(73) Assignee: United Conveyor & Machinery, LLC, Hebron, KY (US)

( * ) Notice: Subject to any disclaimer, the term of this patent is extended or adjusted under 35 U.S.C. 154(b) by 0 days.

(21) Appl. No.: 18/328,368

(22) Filed: Jun. 2, 2023

(65) Prior Publication Data

US 2023/0392747 A1 Dec. 7, 2023

Related U.S. Application Data

(60) Provisional application No. 63/348,208, filed on Jun. 2, 2022.

(51) Int. Cl.
| | |
|---|---|
| *F16P 3/00* | (2006.01) |
| *B65G 43/00* | (2006.01) |
| *F16L 3/18* | (2006.01) |
| *H01H 3/02* | (2006.01) |

(52) U.S. Cl.
CPC .................... *F16P 3/00* (2013.01); *F16L 3/18* (2013.01); *B65G 43/00* (2013.01); *H01H 3/022* (2013.01)

(58) Field of Classification Search
CPC ... H01H 3/022; F16P 3/00; F16L 3/18; B65G 43/00; B65G 2207/40; B65G 2811/093
USPC ............................................. 198/794, 502.1
See application file for complete search history.

(56) References Cited

U.S. PATENT DOCUMENTS

| | | | | |
|---|---|---|---|---|
| 2,951,576 | A * | 9/1960 | Buckeridge | B65G 23/00 |
| | | | | 198/573 |
| 5,821,488 | A * | 10/1998 | Falcon | H01H 3/0226 |
| | | | | 200/61.18 |
| 2017/0248481 | A1* | 8/2017 | Bubar | G01L 5/10 |
| 2019/0244780 | A1* | 8/2019 | Tsang | H01H 71/50 |

FOREIGN PATENT DOCUMENTS

| | | | | |
|---|---|---|---|---|
| CH | 643642 A5 | * | 1/1979 | ................ F16L 3/18 |
| CN | 112209051 A | * | 1/2021 | ............. B65G 43/00 |
| CN | 219341328 U | * | 7/2023 | ............. B65G 43/00 |
| DE | 102018004854 A1 | * | 12/2019 | ................ F16P 3/12 |
| EP | 1995509 A2 | * | 11/2008 | ............. B65G 43/00 |

* cited by examiner

*Primary Examiner* — James R Bidwell
(74) *Attorney, Agent, or Firm* — Wood Herron & Evans LLP

(57) ABSTRACT

A system for actuating a stop system for a conveyor includes a plurality of mounting plates configured for coupling to a conveyor. A slot is formed in each mounting plate to receive a bobbin extending generally perpendicular to the mounting plate. The bobbins each have an elongated body configured for sliding into a slot of a respective mounting plate and for extending from each side of the mounting plate. A gate element is configured to removably couple with a respective mounting plate to span the slot and contain the bobbin. A passage is formed longitudinally through each elongated bobbin body to receive a cable that spans along the conveyor and moves freely in the bobbins for actuating a stop system when pulled.

20 Claims, 6 Drawing Sheets

ACTIVATION SYSTEM FOR AN EMERGENCY STOP SYSTEM

CROSS-REFERENCE TO RELATED APPLICATIONS

This application claims the benefit of priority to U.S. Provisional Patent Application Ser. No. 63/348,208 filed Jun. 2, 2022, the disclosure of which is incorporated by reference herein.

FIELD OF THE INVENTION

This present invention relates generally to an emergency stop system for a machine, such as a conveyor or other machine, and more specifically to an activation system for use in activating an emergency stop system.

BACKGROUND OF THE INVENTION

Emergency stop systems and stop mechanisms are implemented in a variety of machine configurations. Many states have safety statutes that require that moving or operating equipment, which may be potentially dangerous to an operator or worker, is equipped with an emergency stop mechanism. The emergency stop mechanism may be selectively engaged to stop the machine and other equipment if their continued operation could cause damage or injury to the equipment or operators of the equipment. For example, many statutes require such emergency stop systems for moving conveyor systems, conveyors and related equipment.

Because of the distance over which a conveyor may travel and an operators position therealong, such emergency stop systems must be engaged over an extended distance rather than only at one or two locations, in order to accommodate an operator that could be anywhere along the conveyor line. To that end, many such systems use an elongated emergency cable that extends along the path of a conveyor or along a portion of that path. The cable is configured to be anchored at one end and is coupled at another end with an emergency stop mechanism or switch that, in turn, is coupled to the conveyor or other machine. Pulling or yanking on a portion of that cable with a certain force or tension will translate the force down to an end of the cable that is coupled or connected to the emergency stop mechanism in order to acuate the stop mechanism and terminate power to the conveyor.

Generally, the installed emergency cable has to maintain a certain tension along its length or be taut enough such that a large amount of movement is not required at the engagement point in order to translate the movement down the length of the cable to the stop mechanism. As such, emergency cables are usually mounted along their length at various positions to the conveyor or other equipment. However, existing mount or support mechanisms, such as eye bolts or other bracket elements have proven less than sufficient for the operation of such emergency cable and emergency stop systems in conveyors. Accordingly, there is a need for an improved cable activation system for an emergency stop mechanism and system for a machine, and particularly for an emergency stop system for an elongated conveyor or conveyor system.

SUMMARY OF THE INVENTION

A system for actuating a stop system for a conveyor or other equipment includes a plurality of mounting plates configured for coupling to a conveyor. A slot is formed in each mounting plate to receive a bobbin extending generally to either side of the mounting plate. The bobbins each have an elongated body configured for sliding into a slot of a respective mounting plate and for extending from each side of the mounting plate. A gate element is configured to be removably couple with a respective mounting plate to span the slot and contain the bobbin. A longitudinal passage is formed through each elongated bobbin body to receive a cable that spans along the conveyor or other equipment and moves freely in the bobbins for actuating a stop system when pulled.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF EMBODIMENTS OF THE INVENTION

Figure 1:
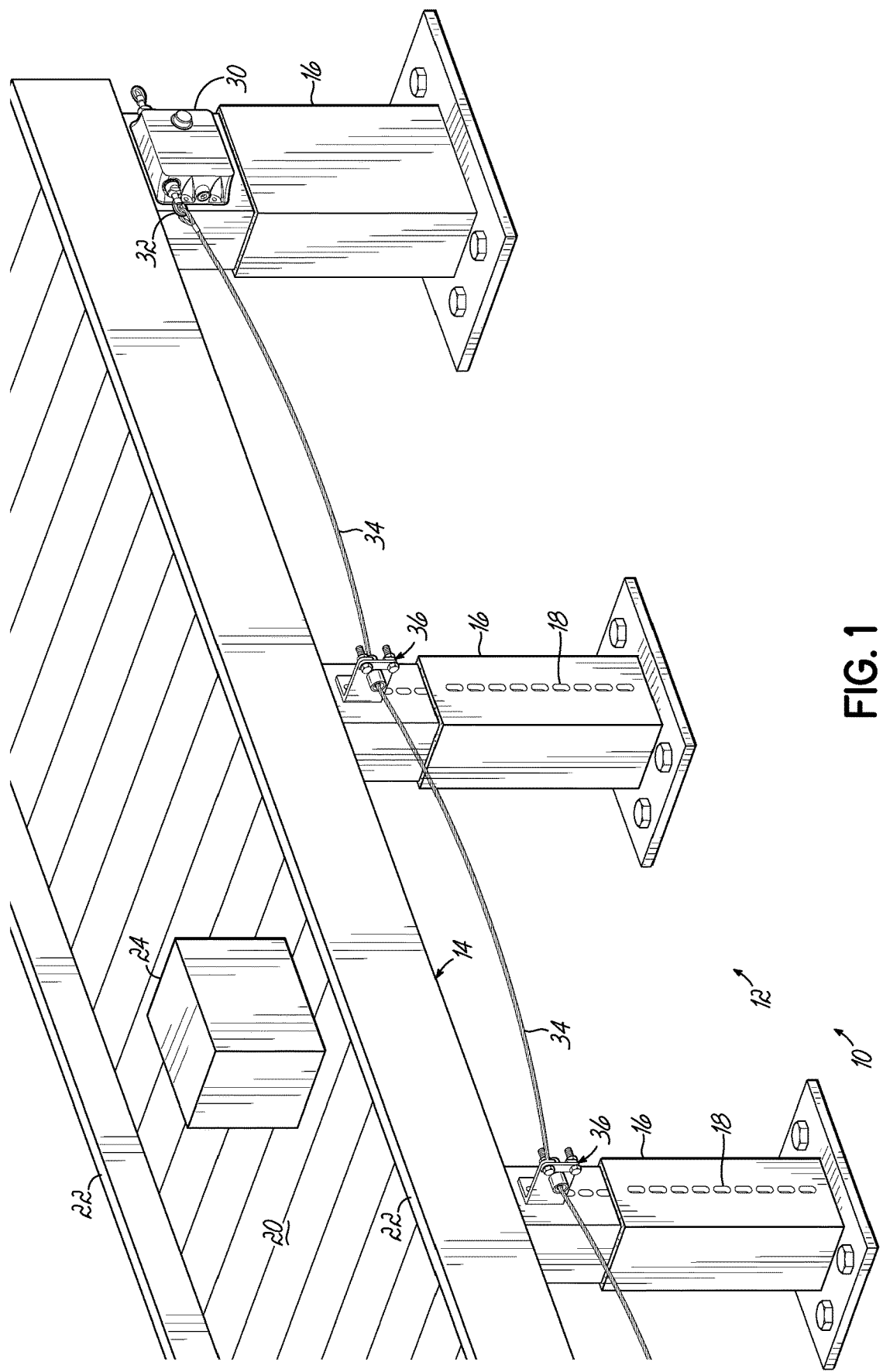
FIG. 1 illustrates a perspective view of a conveyor system implementing the mounting system for an emergency stop mechanism cable in accordance with an embodiment of the invention.

FIG. 1 illustrates a machine or machine system 10 for implementing embodiments of the present invention. The present invention may be utilized with a number of different machines, including conveyors or conveyor systems, that have moving parts. Such machines may require an emergency stop system or stop mechanism to be actuated to stop movement of the machine or a portion of the machine. In the illustrated embodiments discussed herein, the machine system is a conveyor system; however, the present invention and its use is not limited to just conveyor systems.

More specifically, for the purpose of an exemplary embodiment, FIG. 1 illustrates the invention used in a conveyor system 10 that conveys one or more items along its length or along a conveying path. The present invention may also be used with other equipment for actuating an emergency stop system or mechanism to stop operation of the equipment. FIG. 1 shows a portion of the path of a longer conveyor. The conveyor system 10 implements a support frame 12 that may include a conveying platform 14 elevated above a floor. The conveyor system frame 12 includes one or more leg elements 16 to support the conveying platform 14 above the floor surface. As illustrated in FIG. 1, the leg elements 16 may include features 18 that allows the height of the leg elements to be adjusted to vary the height of the conveying platform. The conveyor system 10 further includes a conveying mechanism that includes movable elements that may need to be stopped. In accordance with the illustrated embodiment, the conveyor system includes a movable conveying surface 20 that is configured to move and to move items 24 with respect to the support frame 12 and the conveying platform 14. Other movable elements might be implemented and the invention is not limited to the type of equipment or elements that would be stopped in emergency situations, using the invention. The conveying surface 20 may incorporate one or more of a belt, a chain, or rollers or other appropriate movable conveying elements that provide motion to the conveying surface and act on an item 24 for moving the item 24 that sits on or contacts the conveying surface 20. As such, the present invention is also not limited to the type of machine elements used in the conveying system. The conveying platform 14 may be configured with appropriate sides 22 containing the items 24 moving on the conveying surface. The conveying surface 20 and the elements thereof may be coupled with a power source and other mechanisms (not shown) for providing the necessary power and movement of the elements for moving the conveying surface 20 and items 24.

In certain situations, it is necessary or desirable to stop movement of the conveying surface 20 or other moving equipment quickly, such as in an emergency situation where a person might be injured or the machine is malfunctioning or might be damaged. To that end, the conveying system 10 incorporates a stop system or emergency stop system that includes a stop mechanism 30 that is appropriately coupled with the power source for the conveyor system for cutting off power and thus stopping the moving elements of the conveying system 10. A number of different emergency stop mechanisms 30 or stop switches may be implemented, and essentially provide a positive shutoff of potentially dangerous equipment in an emergency. Such mechanisms are usually coupled with a cable that is used in an emergency situation to provide actuation at different locations removed from the actual stop mechanism 30.

Referring to FIG. 1, a stop mechanism 30 will generally be mounted proximate to the moving conveying surface 20, such as on an element of the support frame 12 of the conveyor system. The stop mechanism 30 includes a movable actuator element 32 that is appropriately coupled with a cable 34 as shown. As may be appreciated, that mechanism, and the actuator element 32 may take a number of different forms and thus the embodiment illustrated is not limiting to the present invention. All such mechanisms will be appropriately coupled with cable 34, such that a pulling force on cable 34 can create a tension thereon that is translated down the cable and that will then pull or otherwise move the actuator element 32 to initiate a stop of the conveying surface through the stop mechanism 30. As illustrated, the cable 34 is generally configured to span along some portion of the path or a length defined by the conveyor system 10, and particularly along the length of the conveying platform 14 and conveying surface 20. In that way, the cable may be engaged at various positions along the conveyor path as needed based on the location of the person that grabs it. This will allow personnel to initiate an emergency stop at a number of different positions along the system 10, as needed.

In accordance with the present invention, the cable 34 must be supported along the conveyor system to be accessed at various positions, and particularly may extend along the path of the conveying surface 20. For such support, the cable 34 must maintain a particular amount of tension along its length so that only a small movement distance of the cable, such as by pulling the cable away or up or down with respect to the conveyor system is necessary to actuate the stop mechanism 30. That is, the cable 34 cannot be supported with too much sag or looseness in its mounting so as to require a significant movement distance and then a time delay in the shut off in an emergency situation. Therefore, the cable 34 must be mounted and supported so that a short movement distance or pull of the cable thereof will readily translate the pulling force to actuate the stop system and initiate a stop sequence in the conveying surface or other moving portion or element of the machine being stopped.

To that end, as illustrated in FIG. 1, the invention and the conveyor system implements a plurality of cable mounts 36 that are mounted along a portion of the length of the conveyor system or conveying surface 20 and proximate to the conveying platform 14. In the embodiment illustrated in FIG. 1, the cable mounts 36 are mounted to the support frame and particularly on leg elements 16 of the support frame, that are periodically spaced along the conveying surface 20. The invention is not limited to where the mounts are positioned or mounted. For example, a spacing of 8 to 12 feet may be appropriate for each of the cable mounts 36. While the cable mounts are illustrated mounted on the leg elements of the support frame 12, they may be just as readily mounted on other elements of the support frame, such as the conveying platform 14 and particularly to one or more sides 22 of the conveying platform. As such, the present invention is not limited as to where the various cable mounts 36 are positioned, as long as they can support and mount the cable 34 proximate to where personnel will be working with respect to conveyor system 10 and any moving elements, in order to be readily accessible.

Figure 2:
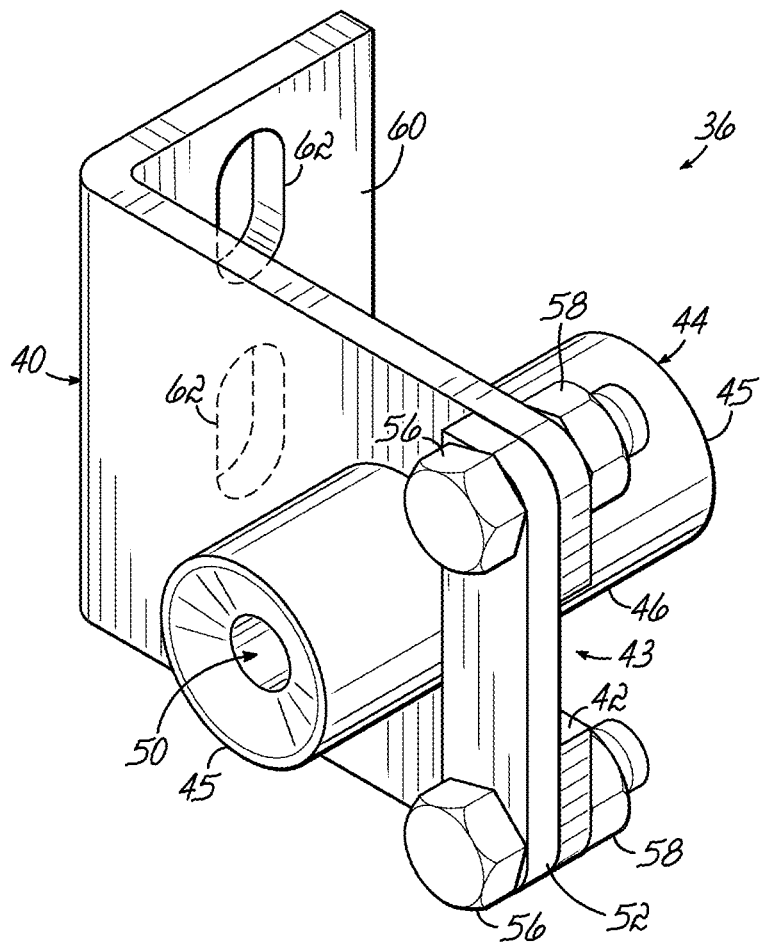
FIG. 2 illustrates a perspective view of a cable mount as implemented in the inventive mounting system of FIG. 1 in accordance with an embodiment of the invention.
Figure 3:
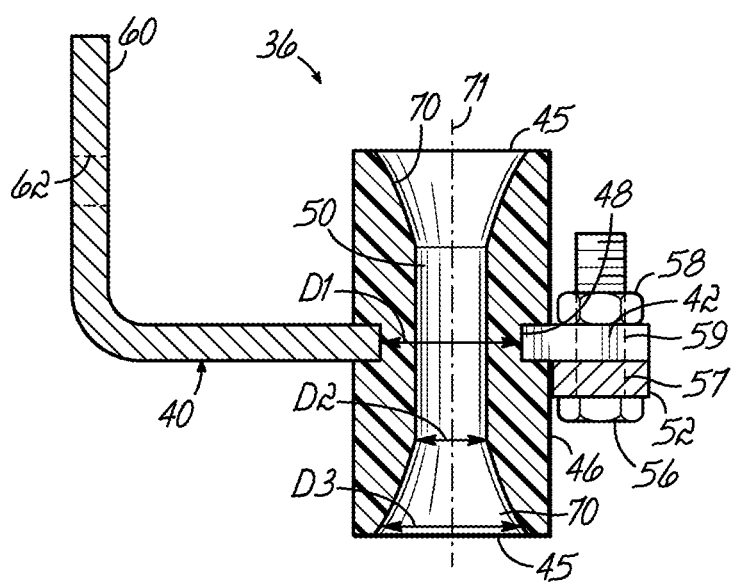
FIG. 3 illustrates a top cross-sectional view of a cable mount as implemented in the inventive mounting system of FIG. 1 in accordance with an embodiment of the invention.
Figure 5:
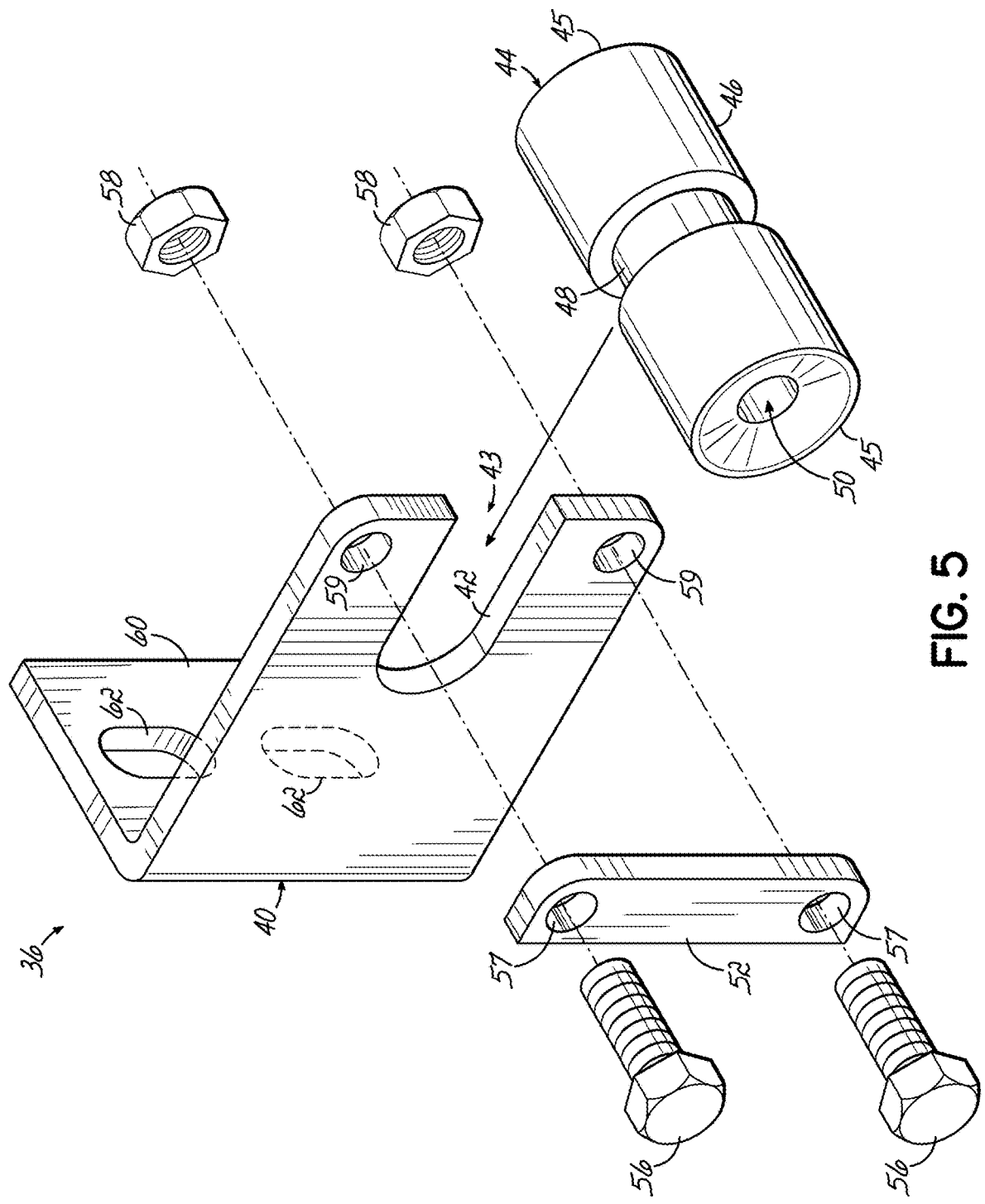
FIG. 5 illustrates an exploded view of the cable mount of FIG. 2.

Referring to FIGS. 2 and 3, a cable mount 36 is shown and includes a mounting plate 40 configured for coupling with the machine, such as with the support frame 12 of a conveyor system 10 as shown in FIG. 1. Referring to FIG. 5, the mounting plate 40 includes a slot 42 formed in the mounting plate 40 that has an open end. A bobbin 44 engages with the mounting plate 40 and generally extends perpendicular to the plane defined by the generally flat mounting plate 40. Bobbin 44 has an elongated body 46 that is configured for sliding into the slot 42 of the mounting plate and then extending from each side of the mounting plate as illustrated in FIGS. 2 and 3. The mounting plate 40 may be formed of an appropriate material, such as plastic or metal. In one embodiment, the mounting plate is made of 3/16" thick metal. The bobbin 44 is made of a low friction material such as Ultra High Molecular Wear plastic or UHMW. Bobbin 44 includes a groove 48 that is formed circumferentially around the body 46. The groove 48 is configured and has a desirable gap with respect to body 46 so as to engage the slot 42 of mounting plate 40 so that the bobbin may slide therein.

Referring to FIG. 3, the outer diameter $D_1$ formed by groove 48 is such that the bobbin 44 fits snugly into slot 42 and thus, in one embodiment, generally will not freely rotate or spin. Alternatively, the diameter $D_1$ might be dimensioned such that the bobbin body 46 will more freely rotate or spin within slot 42 when mounted therein. However, the design of the invention does not hinge on the necessity of the bobbins ability to spin, thus one embodiment is designed to trap the bobbin in the slot 42.

Referring to FIGS. 2 and 3, a passage 50 is formed longitudinally through the elongated bobbin body 46. The longitudinal passage 50 is configured to receive a cable for supporting a portion of the cable 34 and for allowing the cable to move freely in the bobbin 44 for actuating a machine stop system when pulled. The bobbin body 46 and passage 50 may be appropriately formed and dimensioned based upon the size of the cable 34 that is to be held in the bobbin and mounted with the cable mount 36. Accordingly, the bobbin body 46 and passage 50 may take various dimensions as appropriate. In one embodiment, the bobbin is cylindrical in shape and is approximately two inches long and has an outer diameter of approximately one inch.

Once the bobbin body 46 has been mounted into the slot 42 of plate a gate element is used to contain the bobbin 44. Specifically, a gate element 52 in the form of another plate may be removably coupled with a respective mounting plate 40. The gate element 52 as illustrated in FIG. 2 is configured to at least partially span an open end 43 of the slot 42 and contain the bobbin 44 in the mounting plate 40. The gate element 52 may be coupled with the mounting plate 40 using appropriate fasteners, such as nuts 56 and bolts 58. Other fasteners and mechanisms might be used to removably couple the bobbin 44 with the mounting plate 40 and cable mount 36.

The cable mount 36 may be coupled with or fastened with the machine, such as conveyor system 10 in a number of ways. For example, mounting plate 40 might be mounted directly to a portion of the conveyor system or other machine, such as using appropriate fasteners, such as nuts and bolts, not shown. To that end, the mounting plate 40 may include an angled portion 60 configured for mounting to the conveyor system 10 or other machine to secure the mounting plate so that the mounting plate extends away from the mount surface. In the illustrated embodiment, the mounting plate extends generally perpendicular to the surface it is mounted on or generally perpendicular to the conveyor path so the cable may be mounted to extend generally parallel to that path in certain portions of the conveyor system. For that purpose, the angled portion 60 of the cable mount 36 incorporate a plurality of openings 62 therethrough for passing fasteners through the angled portion into a mount surface. In one embodiment of the invention, the opening 62 may be elongated to provide for adjustment in the mounting position of the cable mount on a surface of the support frame or other element within conveyor system 10.

Figure 4:
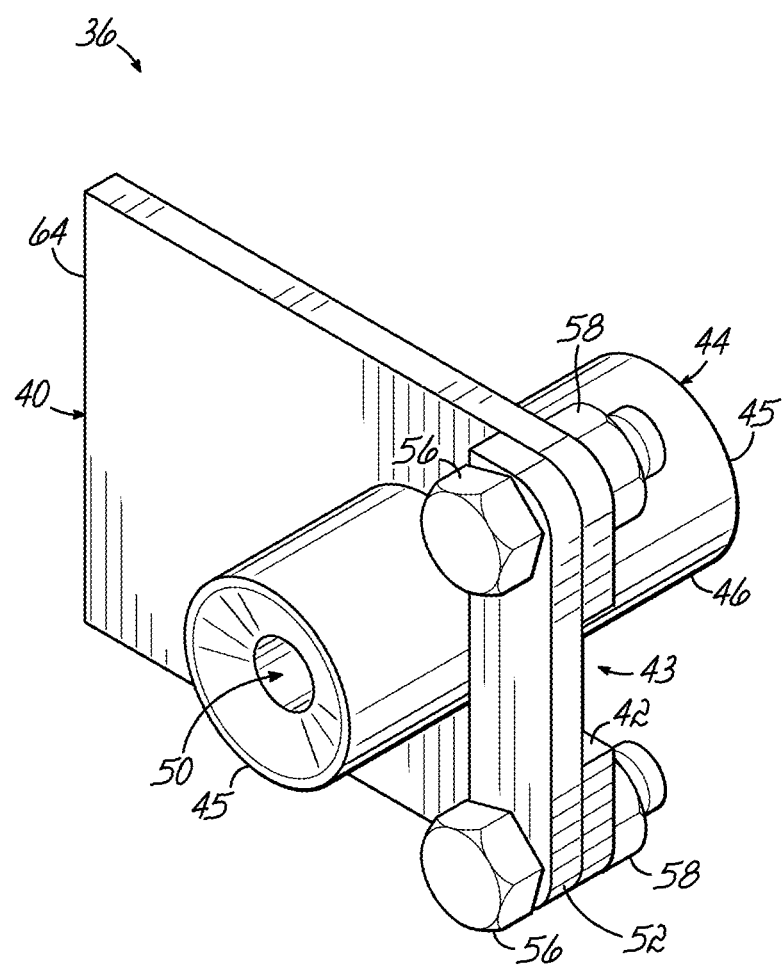
FIG. 4 illustrates a perspective view of a cable mount in accordance with an alternative embodiment of the invention.
Figure 6:
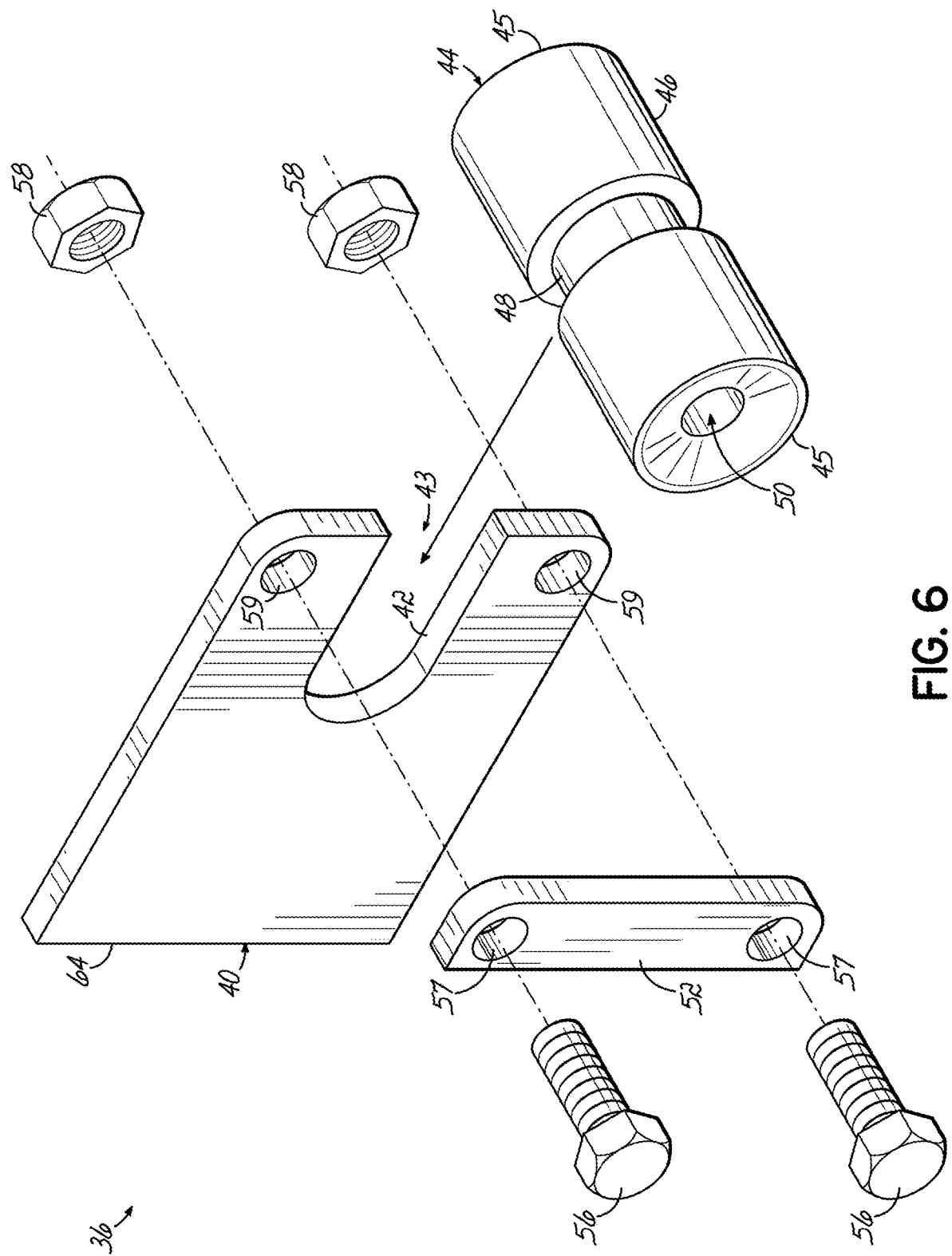
FIG. 6 illustrates an exploded view of the cable mount of FIG. 4.

In an alternative embodiment the invention, as illustrated in FIGS. 4 and 6, the mounting plate may be configured to be welded along an edge 64 directly to a mount surface of a conveyor system 10, such as to a mount surface of some portion or element of the support frame 12.

Figure 7:
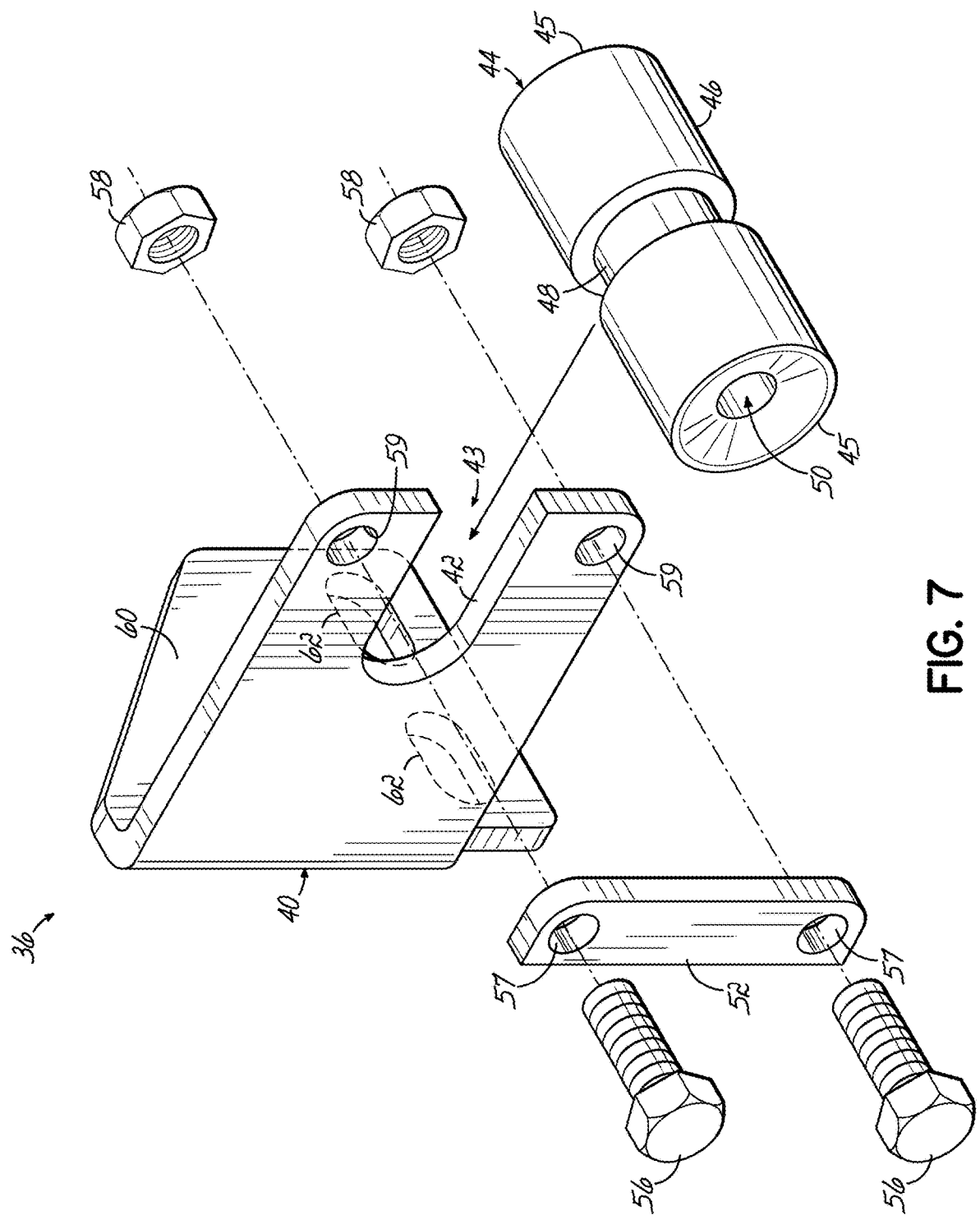
FIG. 7 illustrates an exploded view of an alternative embodiment of the cable mount for alternative mounting to a mounting surface.

FIG. 7 illustrates another alternative embodiment of the cable mount 36 that has an alternative angled portion 60 that positions openings 62 in a different orientation to the plane of the mounting plate 40 to address other mounting surface arrangements. The mount 36 of FIG. 7 is also configured to present the mounting plate 40 generally perpendicular to a mounting surface so the bobbin body 44 extends along the path or length of the conveyor system.

In accordance with another aspect of the invention, the bobbin body 44 includes opposing ends 45 and the longitudinal passage 50 that is formed through bobbin body 46 includes at least one tapered portion 70 that tapers radially outwardly from the passage as the passage extends toward an end of the bobbin body 46. Specifically, as illustrated in FIG. 3, taper portion 70 tapers radially outwardly from a first inner diameter $D_2$ in the passage to a larger inner diameter $D_3$ toward an end 45 of the bobbin body. As illustrated in FIG. 3, passage 50 includes radially tapered portions 70 at each end 45 of the bobbin body, and the portions taper radially outwardly from a smaller diameter to a larger diameter. In that way, the feed of the cable through of the cable mount provides for deflection of the cable in the passage 50 due to the larger diameter of the tapered portions proximate to the ends 45 of the bobbin body 46. This provides lower friction in the pulling of the cable through the cable mount and bobbin 44 due to the reduced drag or friction proximate those in feed and out feed ends 45 when the cable is grabbed and deflected in an emergency situation. The cable is to remain somewhat taut in the rest position but must be readily movable through the support system when pulled in order to actuate the stop mechanism. The tapered portions 70 formed as part of the cable passage ensure free movement of the cable and proper deflection when the cable is pulled.

Furthermore, the tapered portions 70 provide the ability of the cable to be oriented at an angle with respect to the in feed and out feed of the bobbin body 46 and still move freely in the bobbin. In that way, the conveyor system and the path of the conveyor system can be angled or curved over the length of the conveying platform 14. The cable 34 mounted with the invention can still freely follow the curved or angled path without being pinched or otherwise hindered or impeded in its movement through the bobbin body 46 and passage 50. In one embodiment of the invention, the tapered portion 70 may be formed between an inner diameter $D_2$ of 0.375 inches and outer diameter $D_3$ of 0.5 inches that generally creates an angle theta to a longitudinal reference line 71 in the range of 13-21 degrees.

In one embodiment of the invention, the length of the cable might be limited by regulations to 100 feet. Based upon the number of mounts 36, the span of the cable may be supported in a robust and low friction arrangement that provides for taut cable support as well as smooth movement of the cable in an emergency situation. If the mounts 36 are positioned 8 to 10 feet apart on a conveyor system 10, then generally 10 or so inventive mounts might be utilized to support a 100 foot cable from one end to its engagement and with a stop mechanism 30 as illustrated in FIG. 1.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A system for actuating a stop system for a conveyor comprising:
   a plurality of mounting plates configured for coupling to a conveyor, a slot being formed in each mounting plate and having an open end;
   a plurality of bobbins, a bobbin extending generally perpendicular to a respective mounting plate, each bobbin having an elongated body configured for sliding into a slot of the respective mounting plate;
   a gate element configured to removably couple with a respective mounting plate, the gate element configured to at least partially span the slot and contain the bobbin in the mounting plate;
   a longitudinal passage formed through each elongated bobbin body;
   a cable configured to span along at least a portion of the length of a conveyor and pass through the longitudinal passages of the bobbins, the cable moving freely in the bobbins for when the cable is engaged to translate a force for actuating a stop system.

2. The system of claim 1 wherein each bobbin includes a groove formed circumferentially around the body, the groove of a bobbin configured for engaging the slot of the respective mounting plate so the bobbin slides therein.

3. The system of claim 2 wherein each bobbin groove is configured for engaging the slot so the bobbin rotates in the slot.

4. The system of claim 1 wherein the bobbin body has opposing ends, the longitudinal passage formed through the bobbin body including at least one tapered portion that tapers radially outwardly as the passage extends toward an end of the bobbin body.

5. The system of claim 4 wherein the bobbin body longitudinal passage has a tapered portion that tapers radially outwardly at each of the opposing ends of the bobbin body.

6. The system of claim 1 wherein the gate element includes a plate configured for removably coupling with the respective mounting plate to at least partially span the slot.

7. The system of claim 1 wherein the mounting plate includes an angled portion configured for mounting to a mounting surface of a conveyor to secure the mounting plate generally perpendicular to the mounting surface.

8. A conveyor system comprising:
   a conveyor including a support frame and a conveying mechanism movable with respect to the support frame for conveying items in the conveyor system;
   a stop mechanism configured, when actuated, to stop the conveying mechanism;
   a plurality of mounting plates configured for coupling with the support frame, a slot being formed in each mounting plate and having an open end;
   a plurality of bobbins, a bobbin extending generally perpendicular to a respective mounting plate, each bobbin having an elongated body configured for sliding into a slot of the respective mounting plate;
   a gate element configured to removably couple with a respective mounting plate, the gate element configured to at least partially span the slot and contain the bobbin in the mounting plate;
   a longitudinal passage formed through each elongated bobbin body;
   a cable configured to span along at least a portion of the length of a conveyor and pass through the longitudinal passages of the bobbins, the cable configured for coupling with the stop mechanism, the cable moving freely in the bobbins for when the cable is engaged to translate a force for actuating the stop mechanism.

9. The conveyor system of claim 8 wherein the conveyor mechanism is a conveyor surface.

10. The conveyor system of claim 8 wherein each bobbin includes a groove formed circumferentially around the body, the groove of a bobbin configured for engaging the slot of the respective mounting plate so the bobbin slides therein.

11. The conveyor system of claim 8 wherein the bobbin body has opposing ends, the longitudinal passage formed through the bobbin body including at least one tapered portion that tapers radially outwardly as the passage extends toward an end of the bobbin body.

12. The conveyor system of claim 11 wherein the bobbin body longitudinal passage has a tapered portion that tapers radially outwardly at each of the opposing ends of the bobbin body.

13. The conveyor system of claim 8 wherein the gate element includes a plate configured for removably coupling with the respective mounting plate to at least partially span the slot.

14. The conveyor system of claim 8 wherein the mounting plate includes an angled portion configured for mounting to the support frame of the conveyor to secure the mounting plate generally perpendicular to the support frame.

15. A cable mount for mounting a cable used to actuate a machine stop system, the cable mount comprising:
   a mounting plate configured for coupling with a machine, a slot formed in the mounting plate;
   a bobbin extending generally perpendicular to the mounting plate, the bobbin having an elongated body configured for sliding into the slot of the mounting plate;
   a gate element configured to removably couple with the mounting plate, the gate element configured to at least partially span the slot and contain the bobbin in the mounting plate;
   a longitudinal passage formed through the elongated bobbin body, the passage configured for supporting a portion of a cable for the cable to move freely in the bobbin for actuating a machine stop system when pulled.

16. The cable mount of claim 15 wherein the bobbin includes a groove formed circumferentially around the body, the groove of the bobbin configured for engaging the slot of the mounting plate so the bobbin slides therein.

17. The cable mount of claim 15 wherein the bobbin body has opposing ends, the longitudinal passage formed through the bobbin body including at least one tapered portion that tapers radially outwardly as the passage extends toward an end of the bobbin body.

18. The cable mount of claim 15 wherein the bobbin body longitudinal passage has a tapered portion that tapers radially outwardly at each of the opposing ends of the bobbin body.

19. The cable mount of claim 15 wherein the gate element includes a plate configured for removably coupling with the mounting plate to at least partially span the slot.

20. The cable mount of claim 15 wherein the mounting plate includes an angled portion configured for mounting to a machine to secure the mounting plate.

* * * * *